United States Patent
Groh (10) Patent No.: US 11,300,406 B2
(45) Date of Patent: Apr. 12, 2022

(54) MULTIPLE-STAGE METHOD OF INVESTIGATING SURFACES AND CORRESPONDING APPARATUS

(71) Applicant: BYK-GARDNER GMBH, Geretsried (DE)

(72) Inventor: Christopher Groh, Kempten (DE)

(73) Assignee: BYK-GARDNER GMBH

( * ) Notice: Subject to any disclaimer, the term of this patent is extended or adjusted under 35 U.S.C. 154(b) by 124 days.

(21) Appl. No.: 14/749,281

(22) Filed: Jun. 24, 2015

(65) Prior Publication Data
US 2015/0369595 A1   Dec. 24, 2015

(30) Foreign Application Priority Data

Jun. 24, 2014   (DE) ..................... 10 2014 108 789.5

(51) Int. Cl.
*G01B 11/30*   (2006.01)
(52) U.S. Cl.
CPC ................. *G01B 11/303* (2013.01)
(58) Field of Classification Search
CPC ............ G01B 11/303; G01B 11/24; G01B 11/0608; G01J 3/46–528
USPC ................................... 356/600–640
See application file for complete search history.

(56) References Cited

U.S. PATENT DOCUMENTS

| | | | | |
|---|---|---|---|---|
| 3,602,596 A | * | 8/1971 | Astheimer | G01B 11/303 356/51 |
| 4,750,140 A | * | 6/1988 | Asano | G01B 11/303 356/445 |
| 5,103,106 A | * | 4/1992 | Golberstein | G01B 11/026 250/559.4 |
| 5,424,838 A | * | 6/1995 | Siu | G01N 21/95684 250/559.4 |
| 5,889,592 A | * | 3/1999 | Zawaideh | G01B 11/0625 356/504 |
| 6,038,026 A | * | 3/2000 | Maris | G01B 11/303 356/514 |
| 6,621,581 B1 | * | 9/2003 | Hunt | G01B 11/0608 356/601 |
| 6,937,341 B1 | * | 8/2005 | Woollam | G01N 21/211 356/364 |

(Continued)

FOREIGN PATENT DOCUMENTS

| | | | | |
|---|---|---|---|---|
| CN | 101887033 | | 11/2010 | ........... G01N 21/956 |
| CN | 101957187 | | 1/2011 | ............. G01B 11/30 |

(Continued)

OTHER PUBLICATIONS

Japanese Office Action (w/machine translation) issued in application No. 2015-125721, dated Jan. 16, 2019 (19 pgs).

(Continued)

*Primary Examiner* — Tri T Ton
(74) *Attorney, Agent, or Firm* — Hayes Soloway P.C.

(57) ABSTRACT

A multiple-stage method of determining surface properties, with the steps:
  determining at least one topographical property of at least one region of a surface to be investigated,
  determining an optical property of at least this region of the surface to be investigated and emitting at least one value which is characteristic of this optical property.
When the value which is characteristic of this optical property is determined, the topographical property of the region is taken into consideration.

16 Claims, 2 Drawing Sheets

(56) References Cited

U.S. PATENT DOCUMENTS

| | | | |
|---|---|---|---|
| 7,576,845 B2 | 8/2009 | Asakura et al. | 356/73 |
| 8,355,141 B2 | 1/2013 | Schwarz et al. | 356/600 |
| 9,256,912 B2 | 2/2016 | Jeong et al. | G06T 1/00 |
| 9,772,413 B2* | 9/2017 | Krohn | G01V 1/282 |
| 2003/0227632 A1* | 12/2003 | Marcus | G01B 11/303 356/497 |
| 2004/0119833 A1* | 6/2004 | Duncan | G01B 11/24 348/207.99 |
| 2004/0238636 A1* | 12/2004 | Marx | G01B 11/02 235/454 |
| 2004/0239905 A1* | 12/2004 | Van Rhee | G03F 7/70508 355/55 |
| 2005/0283065 A1* | 12/2005 | Babayoff | A61B 1/00009 600/407 |
| 2009/0046301 A1* | 2/2009 | Asakura | G01B 11/24 356/610 |
| 2009/0202154 A1* | 8/2009 | Swonger | G01N 21/8806 382/190 |
| 2010/0290696 A1 | 11/2010 | Jeong et al. | 382/147 |
| 2011/0080561 A1* | 4/2011 | Hayashi | A61B 3/1005 351/206 |
| 2016/0022389 A1* | 1/2016 | Esbech | G01J 3/513 250/208.1 |

FOREIGN PATENT DOCUMENTS

| | | | |
|---|---|---|---|
| IL | WO 0151885 A1 * | 7/2001 | G01B 11/0608 |
| JP | 5-175310 | 7/1993 | H01L 21/66 |
| JP | H09126744 | 5/1997 | G01B 11/30 |
| JP | 2007155600 | 6/2007 | G01B 11/25 |
| JP | W02009083248 | 7/2009 | G01B 11/25 |
| JP | 2010266445 | 11/2010 | G01N 21/956 |
| JP | 2011149736 | 8/2011 | G01B 11/02 |
| JP | 2011232192 | 11/2011 | G01B 11/30 |
| WO | WO2007114189 | 11/2007 | G01B 11/25 |

OTHER PUBLICATIONS

Japanese Office Action (w/machine translation) issued in application No. 2015-125721, dated Sep. 19, 2019 (17 pgs).
Chinese Office Action (w/machine translation) issued in application No. 201510352841.3, dated Mar. 9, 2020 (40 pgs).
Chinese Office Action (w/machine translation) issued in application No. 201510352841.3, dated Sep. 5, 2018 (22 pgs).
Japanese Office Action (w/machine translation) issued in application No. 2002-203174, dated Nov. 26, 2021 (6 pgs).

* cited by examiner

MULTIPLE-STAGE METHOD OF INVESTIGATING SURFACES AND CORRESPONDING APPARATUS

The present invention relates to a method and an apparatus for the investigation of surfaces, in particular with respect to optically perceptible properties. Numerous methods of investigating surface properties are known from the prior art. These methods are frequently concerned with obtaining an impression as realistic or objective respectively as possible of a surface, for example even when taking into consideration influences such those of the irradiated light. In some of these apparatus light is therefore irradiated onto the surface at a pre-set angle and the light scattered and/or reflected by the surface is observed with an image-recording device, such as for example a camera.

In addition, textured surfaces are also known from the prior art, i.e.—in the following—surfaces which also have a certain texture, in particular a topography, for example roughness, impressed 3-dimensional textures, or curvatures, at a right angle to their longitudinal direction. Although in principle a textured surface of this type should likewise be evaluated optically, the problem arises in part that the optical evaluation cannot decide whether certain measurement values or phenomena actually result from differences in colour or gloss of the surface observed or whether these impressions result from the texture or topography respectively of the surface, for example as a consequence of shadowing and shading or derive from regions of this apparatus observed from [a] different direction. If, for example, curved or textured surfaces are recorded, then results of an image evaluation can also arise from this curvature or texture of the surface to be investigated. The texture observed visually, i.e. the overall impression of the surface, is formed from the reflecting ability and the topography. The reflecting ability in turn is subdivided into directed reflection (gloss, DOI, haze, orange peel) and non-directed reflection (paint).

The object of the present invention is therefore to achieve as realistic an evaluation of surfaces as possible and, in particular, to permit an observation which can also take into consideration or differentiate effects which are caused by a surface topography. These objects are attained according to the invention by the subjects of the independent claims. Advantageous embodiments and further developments form the subject matter of the sub-claims.

In the case of a multiple-stage method according to the invention of determining surface properties, at least one texture property and/or topographical property of at least one region of a surface to be investigated is or are determined in a first step. An optical property of at least this region of the surface to be investigated is determined in a further method step and at least one value is emitted which is characteristic of this optical property.

According to the invention, when the value which is characteristic of this optical property is determined, the textural property or topographical property respectively of this region is taken into consideration. Taking this value into consideration can be carried out in different ways in this case. In this way, the value to be determined could also depend upon the topographical property determined, for example a curvature of the surface, and this curvature could be included for example in a calculation. In addition, it would be possible, as explained in greater detail below, for the surface first to be subdivided into a plurality of regions with different topographical properties, and these topographical properties can then be taken into consideration separately for the further evaluation.

The expression "taking into consideration" is understood to mean that the topographical properties mentioned are taken into consideration in particular in such a way that at least one measurement value, which is characteristic of these properties, or a value derived from it is used during the evaluation, for example is used mathematically.

In this way for example, a curvature of the surface can be determined or a derivation of a vertical profile, in particular in a specified region or at a specified point, and this value can in turn be compared in a mathematical manner with a specified one of an optical property specified at this point, for example in that both this value and the optical property are used in the determination or calculation respectively of a result value. With a knowledge of the geometry of the measuring instrument the angle-dependent reflection behaviour can thus be determined without a goniometric structure. In this case the radiation directions of the incident light and of the reflecting light are preferably related to the surface perpendicular of the individual surface regions or points respectively. A surface point is a very small surface region. It is advantageous in terms of the evaluation for the direction of observation and the direction of the incident light to coincide. Instead of the curvature, however, use can also be made of the height (absolute or relative respectively) of the aforesaid point. Further surface properties can be obtained therefrom, such as for example the difference in reflection between surface segments situated at a higher and lower level.

It is preferable in a further method step for at least two regions of this surface, which differ in this topographical property, to be defined. In a further method step it is preferable for an optical property of at least one of these regions of the surface to be investigated to be determined. In addition, it would be possible for these surface regions to be evaluated separately. It is also possible for the properties of the different surface regions to be compared with one another (for example within the scope of a statistical evaluation).

This procedure is suitable in particular for surfaces which are rough or uneven respectively or textured. In this case "valleys" and "peaks" of this surface can be differentiated from one another in a first method step, in particular if a 3-dimensional structure is involved which displays this mountain and valley behaviour and treated separately in a further method step. In the following evaluation these regions can then be separately evaluated or measured respectively. If the surface to be measured is for example a surface with a specified curvature, this curvature determined in the first method step can be incorporated into the optical measurement or during the evaluation respectively. This can be carried out by means of software.

The measurement method can preferably be used in the field of quality control, defect detection and/or characterization. Surfaces to be investigated can be, in particular, plastics material surfaces, lacquered surfaces, natural surfaces such as for example wood or leather, fabrics, paper, embossed structures and etched structures on metal surfaces or the like.

Regions of tolerance can be defined in the various fields of application. In this case for example regions of tolerance can be defined, of which the surfaces are still graded as visually equal.

A two-stage method is therefore proposed within the scope of the invention. In a first method step the surface to be investigated is analysed with respect to the topographical properties thereof, i.e. in particular a vertical position h(x, y) (in which x and y are two extension directions of this surface at a right angle to each other) and/or curvature and/or change in curvature of individual regions of the surface can be analysed. In order to determine the topography, it is preferable for at least two images of the surface to be recorded, preferably at least three images and preferably at least four images. In this case it is preferable in these different recordings for the surface to be illuminated in directions which are different at least in part.

These regions can be regions of the surface which are offset with respect to other regions in a direction at a right angle to the surface. These can be subsidiary regions of this surface of any size. It would even be possible for even the smallest resolvable regions still just capable of being detected, for example optically or visually respectively, without optical aids to be differentiated from one another. In the case of one arrangement it would be possible for topographical properties first to be defined, for example a first height position range and a second height position range and after that for individual regions of the surface to be allocated to these height position ranges.

In the aforesaid second method step the optical properties can then be selected or determined respectively in a manner dependent upon this region. In this way for example, only those regions of the surface are evaluated in a second step, the topographical properties of which correspond to the conditions pre-set within the scope of the first method step, for example a specified height position or a specified vertical range respectively. In this way, during the evaluation of the surface the aforesaid topographical properties can also be evaluated.

In the case of a further preferred method the topographical property is selected from a group of properties, which contains a height position of regions of the surface, a vertical profile of the regions of the surface, a curvature of regions of the surface, a curvature pattern of the regions of the surface, a curvature change of the regions of the surface, a curvature change pattern of regions of the surface and the like. In particular, the height positions and the curvatures of the surface are particularly relevant for the evaluation of the topographical properties.

In the case of a preferred method a measurement region for the investigation of the optical property is defined in a manner dependent upon at least one measurement value which is characteristic of the topographical property of the surface.

In other words, in this case in the first method step the surface is subdivided into at least two vertical regions (for example by setting a vertical threshold value) and then, on the basis of the measurement values for the topographical property (such as for example a height), at least two groups are formed which are allocated to these two vertical regions and which are differentiated from each other in the second method step. As mentioned, this topography size or the measurement value for the topography size respectively is advantageously a profile of the surface in a direction at a right angle to this surface.

In the case of a further preferred method it would be possible in this case for a plurality of different regions to be defined. In this way for example, a first region could be defined with heights of the surface portions in the region of for example from 0 to 5 µm, a further region between 5 and 10 µm, and a further region between 10 and 20 µm. It is advantageous in this way for the topographical property of the surface to be investigated to be determined in a spatially resolved manner. This means that for a plurality of subsidiary regions or position portions of the surface one measurement value is emitted for the topographical property in each case. It is preferable in a further step for the topographical properties of the subsidiary regions or position portions respectively to be compared with one another and for a measurement value to be generated or calculated respectively from them.

In the case of a further preferred method, in order to determine the optical property, radiation is directed onto the surface by means of a radiation device and radiation reflected and/or scattered by the surface is detected by means of a radiation detector device. In this way, the method of determining the optical property of the surface is advantageously an optical measurement method in which radiation reflected and/or scattered by the surface is recorded. It is advantageous in this case for the radiation detector device to record a spatially resolved image of the surface. It is advantageous for this spatially resolved image to be subdivided in turn in a manner dependent upon the topographical properties of the first method step. In this way, specified pixels or even pixel ranges, which correspond to the topographical properties determined, can be extracted from the recorded image in order to determine the optical properties, and in this case it would be possible for only these regions to be taken into consideration. In this way, it would be possible for example for only those image portions, for example pixels, which have resulted in specified topography values in the scope of the first measurement, to be taken into consideration in the scope of determining the optical properties.

It is advantageous for the radiation detector device to record radiation which is scattered and/or reflected substantially at a right angle to the plane of the surface to be investigated. In the case of this embodiment it is therefore preferable for the radiation detector device to be arranged substantially vertically above the surface to be investigated. Another detection direction, however, is also possible. The observation in the vertical direction affords the advantage, however, that the observation can be carried out in a manner independent of the orientation of the sample.

In order to determine the optical property it is advantageous for the radiation device to radiate the light at an angle onto the surface, which forms an angle of less than 30°, preferably of less than 20° and preferably of less than 10° with respect to a perpendicular or a direction at a right angle to the surface respectively. In this case it is possible for the radiation issuing from the first radiation device to be coupled by way of a coupling device such as for example a partially transparent mirror in a vertical direction by way of which the radiation reaches from the surface to the radiation detector device. In this way, the illumination device and the detection device are identical.

In another embodiment light of different wavelengths can be radiated in succession onto the surface. As a result, a spatially resolved colour measurement can be carried out by means of a spatially resolving and/or monochrome detector. Alternatively, the determination of the colour can be carried out by means of a spatially resolving colour sensor, such as for example an RGB camera and a polychrome radiation source.

The illumination to investigate the optical properties, such as for example the colour can take place by means of parallel, convergent or divergent optical paths with a specified arrangement of angles. A spatially diffuse illumination, which is generated for example by means of an integrating sphere or a diffusor device, is likewise possible.

Various illumination detector arrangements are also possible. The angle between the illumination and the detection can assume values of between 0° and 90°, preferably of between 30° and 60°, and in a particularly preferred manner of between 40° and 50°.

One embodiment can contain a polychrome illumination and a spectrally resolving detector, and in another embodiment monochrome light of different wavelengths can be used for illumination and a non-spectrally resolving detector can be used. In addition, combinations of these procedures are possible.

In the case of a further advantageous method the radiation detector device records at least two images of the surface to be investigated in order to determine the optical properties. In this way, the dynamics of the radiation detector device can be increased. It is preferable in this case for the surface to be recorded several times with different lighting times. After that, these images recorded in this way can preferably be prepared in such a way that low-reflection and high-reflection regions can be compared with one another and, in this way, the dynamic region of the overall image is increased. In this way, an overall image can be calculated which is thus formed from the individual images which, in particular, have been recorded from the same surface region.

Specified permissible brightness limits can be defined in the case of the individual images with the different lighting times.

In this case the intensity values of the individual pixels of the overall image can be calculated by averaging for example. Over-illuminated and under-illuminated regions can be disregarded when bringing the individual images together. The resulting overall image has a higher dynamic in the brightness reproduction than the individual images.

It is preferable to select the optical property of the surface to be determined from a group of properties which contains a reflectivity of the surface, a gloss of the surface, colour of the surface and the like.

It is preferable for the same regions of the surface for investigation to be observed or evaluated respectively at least in part in the first and the second method steps. It is advantageous but not absolutely necessary for the same regions of the surface for investigation to be investigated in the first and the second method steps. In this way, it is possible and advantageous for the respective surface regions to be recorded by means of the same radiation detection device or radiation detector device respectively.

In order to analyse the same surface regions or bring them into alignment respectively in the first and second method steps, it is possible for markings such as for example projection points to be projected onto the surface, which allow the images to be superposed congruently on a pixel basis. This is particularly advisable when different detectors are used. In other words individual pixels of an image can be identified and allocated to different points on the surface. With reference to this allocation, when recording a further image this further image can be brought into alignment with the image first recorded. In this way, an evaluation is also possible if readily different regions of the surface have been recorded for the first method step and the second method step. In this way, it is not necessary for the precise position of the image-recording device with respect to the surface to be observed during the entire method. In fact a (desired or undesired) change in position can be taken into consideration. In this way, images can not only be brought into pixel alignment by displacement, but image-processing functions such as zooming, tilting, changes in perspective, distortion corrections can be applied in order to achieve this aim.

In the case of a further advantageous method, in order to determine the topographical property, radiation is likewise directed onto the surface by means of a radiating device and radiation reflected and/or scattered by the surface is detected by means of a radiation detector device which permits a spatially resolved image of the radiation striking it. For this purpose the radiation detector device can have for example a CCD or CMOS chip or a camera or the like.

In order to determine the topographical properties of the surface it is advantageous for this surface to be illuminated from at least two and preferably more different directions. In the case of a further preferred method the surface is illuminated from a direction which with the surface perpendicular or a direction at a right angle to the surface respectively forms an angle which is between 40° and 90°, preferably between 45° and 85°, preferably between 45° and 80°, preferably between 45° and 75°. In the case of the preferred geometry the radiation is irradiated onto the surface at a relatively flat angle with respect to the latter. The lighting time of the radiation detector device should preferably be adapted to the optical properties of the surface in this case. Over-illuminated and under-illuminated areas should preferably be avoided.

A variable setting of the angle is likewise possible. In this way, the optimum angle at which the sample is illuminated and then evaluated can be selected in a manner dependent upon the amplitude of the surface to be investigated and/or the degree of reflection of the sample. It is also possible for different illumination geometries to be capable of being implemented in an appliance and/or controlled in a selective manner.

On account of the illumination of the surface from at least two directions it is possible to measure the surface by means of a photometric analysis. In this way, a shadowing-based reconstruction of the surface to be investigated is possible. In this case the reconstruction of the surface to be investigated is preferably based upon the photometric properties thereof.

Other methods such as white light interferometry, confocal techniques or triangulation methods are likewise possible.

In addition, it would also be possible for the surface to be illuminated peripherally (with respect also to a direction at a right angle to the surface). In addition, it would be possible for the surface to be illuminated with pulsed light. The detection of the image could be synchronized in this case with this pulsed light radiation.

The reconstructed topography and also the further surface properties can be encoded as an image. By way of example, in the topography the height is reproduced as a grey tone in the black-and-white image. This type of data preparation allows analysis with the means of modern image analysis.

In order to determine the topographical properties it is also preferable for at least two image recordings to be made of the surface to be investigated. In this way, a multiplicity of irradiances (the entire power of the incoming electromagnetic energy which strikes a surface, relative to the size of the area) can be allocated to an imaged surface point, in particular without a correspondence problem arising in this case.

It is therefore preferable for an image of the same surface region for observation to be evaluated at least twice, in which case an evaluation with respect to the topographical properties is carried out in the first evaluation and an evaluation with respect to the aforesaid optical properties is carried out within the scope of the second evaluation. In this case it would be possible for only one image to be recorded and for this to be evaluated both with respect to the topographical properties and with respect to the optical properties. For evaluation purposes, however, it is preferable for at least two images of the surface for investigation and preferably two images of the same region of the surface for investigation to be evaluated.

In this case it is possible for the radiation device which is used for the evaluation of the surface for the topographical properties to irradiate the light or the radiation respectively onto the surface at a different angle from the radiation device which is used for the evaluation of the optical properties.

As mentioned above, it is preferable for the same radiation detector device to be used to determine the optical property and to determine the topographical property. It is also advantageous, in order to determine the topographical property and to determine the optical property, to retain one position of a measuring instrument with respect to the surface. In this way, it is possible to ensure that the same image of the surface to be investigated is recorded at least twice.

It is thus advantageous to record a spatially resolved image of the surface to be investigated in order to determine the topographical property and/or to record a spatially resolved image of the surface to be investigated in order to determine the optical property. It is advantageous for a time interval between the recording of the spatially resolved image in order to investigate the topographical property and the recording of the spatially resolved image in order to investigate the topographical properties to be less than 3 seconds, preferably less than 2 seconds, preferably less than 1 second and in a particularly preferred manner less than 200 milliseconds.

As short a recording time as possible ensures a locally more precise allocation of all the image elements of the topographical and optical measurement to the associated surface region, since in this case a shift of the measurement region can be prevented more easily. In this way, a corresponding measuring instrument can also be designed in the form of a hand-guided appliance, and this is also a preferred application.

It would be possible in this case, after the measurement for the topographical properties has been carried out, for (at least) one image first to be stored and analysed with respect to the aforesaid topographical properties. After that, the measurement values resulting from the spatially resolved image can be allocated to specified groups. In a further method step the recorded image can possibly even be divided pixel-wise into those regions which have the first topographical properties and those regions which have the second topographical properties. In the second method step the image recorded in turn can then be evaluated in terms of the regions thereof, i.e. those regions with the first structural properties and those regions with the second structural properties can be evaluated separately. Instead of or in addition to this separate evaluation, it would also be possible for specified regions with specified topographical properties to be weighted differently with respect to other regions in the image evaluation or to be compared with one another. A histogram evaluation or another statistical evaluation is also possible, in which case one or more optical properties can be allocated to the different areas of different topographical structures in each case. In the case of a further preferred method the spatially resolved image is thus divided into a plurality of image segments and at least one portion of the image segments is allocated to the first region and at least one portion of the image segments is allocated to the second region. As mentioned above, the image segments in the smallest case can be pixels or, on the other hand, pixel groups, depending upon the resolution in which the measurements are carried out.

The present invention further relates to an apparatus for the investigation of surface properties. This apparatus has a structure-measuring instrument or topography-measuring instrument respectively for detecting an (in particular topographical) structure or surface structure respectively, in particular an instrument for detecting the topography of this surface, which in turn has a radiation device, which directs radiation onto a surface to be investigated, as well as a first radiation detector device which records radiation directed onto the surface and radiation scattered and/or reflected by the surface. In addition, the apparatus has an evaluation device which determines at least one topographical property of the surface to be investigated with reference to the radiation recorded by the first radiation detector device and emits at least one measurement value which is characteristic of the topography of the surface to be investigated.

Furthermore, the apparatus has a second measuring instrument which likewise has a radiation device, which directs radiation onto the surface to be investigated, and also a radiation detector device which records radiation directed onto the surface and radiation scattered and/or reflected by the surface. In this case this radiation detector device allows a spatially resolved recording or evaluation respectively of the radiation striking it.

According to the invention the apparatus has a processor device which emits a value characteristic of the optical property of the surface whilst taking into consideration the measurement value and the spatially resolved recording and/or a value which is characteristic of this recording, in which case it is preferable for a reference to be made to the segmented regions which have been determined by the topography-measuring instrument.

It is therefore also proposed with respect to the apparatus that the topographical properties of the surface to be investigated should be taken into consideration during the optical evaluation.

In the case of a further advantageous embodiment the apparatus has a control device which has the effect that first of all the first radiation device irradiates onto the surface and the radiation detector device records the radiation directed onto the surface and the radiation scattered and/or reflected by the surface and the second radiation device then irradiates onto the surface and the radiation detector device records the radiation directed onto the surface and the radiation scattered and/or reflected by the surface. It is preferable for the radiation detector device, which is a component part of the structure-measuring instrument, to be the same radiation detector device which is a component part of the second measuring instrument.

Furthermore, the apparatus preferably has an allocation device which in the scope of the measurement allocates partial regions of the image recorded by the radiation detector device to a specified structural property of the surface. It is preferable for the radiation devices to have light sources which direct light onto the surface to be investigated. These can be light-emitting diodes for example, which direct light onto the surface. In the case of a further advantageous embodiment the first radiation device direct[s] light onto the surface at an angle different from the second radiation device.

It is preferable for optical elements which are selected from a group of elements, which includes filters, lenses, mirrors, radiation splitters, monochromators, spectrometers, diaphragms, scattering elements and the like, to be situated in a beam path between the respective radiation devices and the radiation detector device.

In a preferred embodiment the illumination and detector arrangement as well as the control means and calculating device are situated in a portable casing. The measuring instrument can preferably be operated by way of a battery. On account of using operating elements and a display, measurements can be carried out and evaluated in situ. It is favourable for the apparatus to have a data interface which allows communication with an external computer. A robot-controlled measurement in an online mode is also possible by way of this interface.

The evaluation can also, however, be carried out on an external computer, and the result calculated can then be sent to the appliance or display respectively. Further advantages and embodiments are evident from the accompanying drawings. In the drawings

Figure 1:
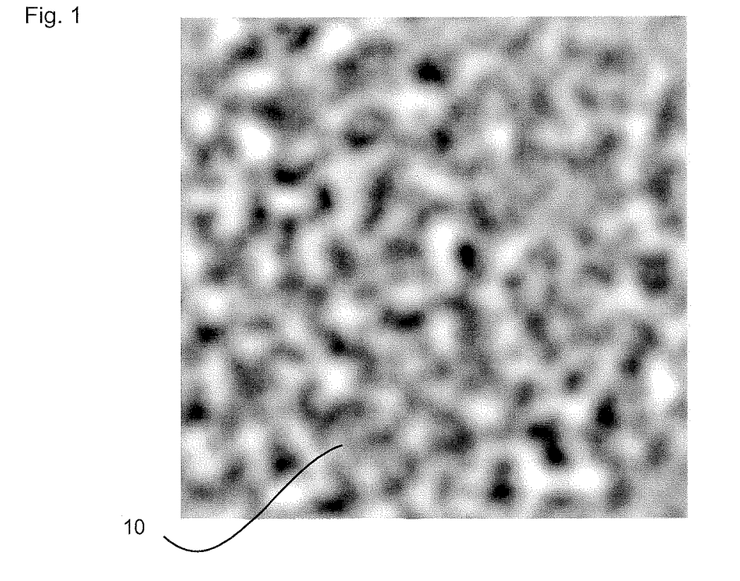
FIG. 1 is an illustration of a surface to explain the object underlying the invention.

FIG. 1 shows a possible surface 10 which can be observed with suitable optical instruments. It is evident that this surface is uneven and has a plurality of projections. Depending upon the incidence of light these projections can cast shadows for example. A pure evaluation in accordance with the intensity would detect different light-dark differences depending upon the incidence of light in the case of this surface.

The invention therefore proposes, as mentioned above, that the nature of the surface should be taken into consideration in a two-stage process.

Figure 2:
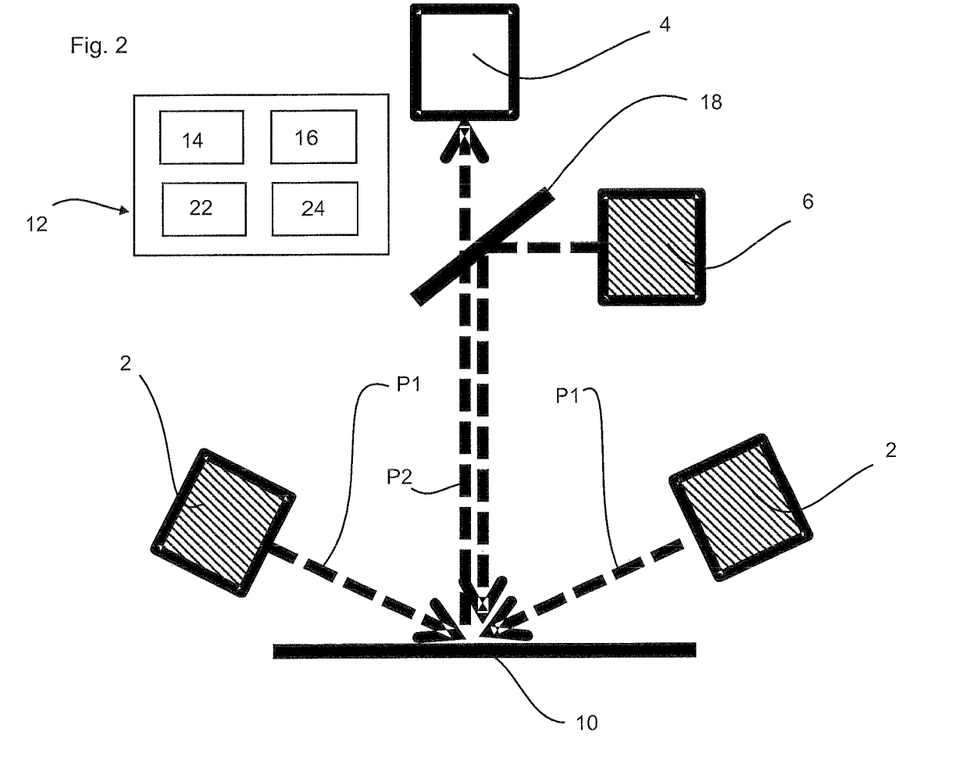
FIG. 2 is a roughly diagrammatic illustration of an apparatus according to the invention.

FIG. 2 is a diagrammatic illustration of an apparatus according to the invention. In this case too, a surface 10 to be observed is again illustrated. The apparatus 1 has a radiation detector device or image-recording device 4 respectively which records images of this surface. This radiation detector device can be, in particular, a colour or a black-and-white camera or a CCD chip. The radiation detector device can also comprise a spatially resolving spectrometer. For reasons of symmetry the radiation detector device is arranged centrally above the observation area. The direction of observation is 0° with respect to the perpendicular of the observation plane.

In a first step, light is directed in this case by way of an illumination device or radiation device 2 respectively, in more precise terms at a flat angle (with respect to the surface). The angle of incidence is between 45° and 85°, preferably between 65° and 75°, with respect to the surface perpendicular. It is advantageous in this case for the illumination device 2 to be a continuous illumination device with a plurality of light sources which thus illuminate the surface 10 from a plurality of sides (arrow P1). The light scattered or reflected respectively by the surface passes along the arrow P2 to the observation device 4 which in this way can also detect the topography of the surface 10.

In this case the radiation source 2 is preferably switched on sequentially, i.e. a plurality of images are recorded in succession, in which case the observation direction is altered. A vertical profile can be calculated from the different images.

The reference number 6 designates a second illumination device which is used for the optical evaluation of the surface 10. In this case, in the embodiment shown in FIG. 2 the light is deflected by way of a partially transparent deflecting mirror 18 onto the surface and the reflected light also passes again to the observation device in this case. The latter can now carry out an optical evaluation of the surface, in which case it is also preferable for data to be taken into consideration for this purpose which have been obtained from the preceding topography measurement.

The reference number 12 designates a control device which controls the entire evaluation. This control device 12 has the effect that first of all the topography of the surface is determined in the first method step and the actual image evaluation is carried out whilst taking into consideration the topography in the second method step. For this purpose the apparatus can also have an image display device 14 which displays an image of the recorded surface to the user. Furthermore, the apparatus can have a memory device 16 in which for example reference data for recorded images are filed. In addition, measured values, such as for example topography data, can be received in this memory device.

The reference number 22 designates a processor device which is used for the evaluation or calculation respectively of the optical values. As mentioned above, in this case this processor device 22 can also take into consideration topography data, such as for example a (local) curvature of the surface or local vertical positions. The reference number 24 designates an evaluation device which determines at least one topographical property of the surface to be investigated with reference to the first radiation detector device. In this case the evaluation can be determined more precisely from the image data obtained from the radiation detector device.

Figure 3:
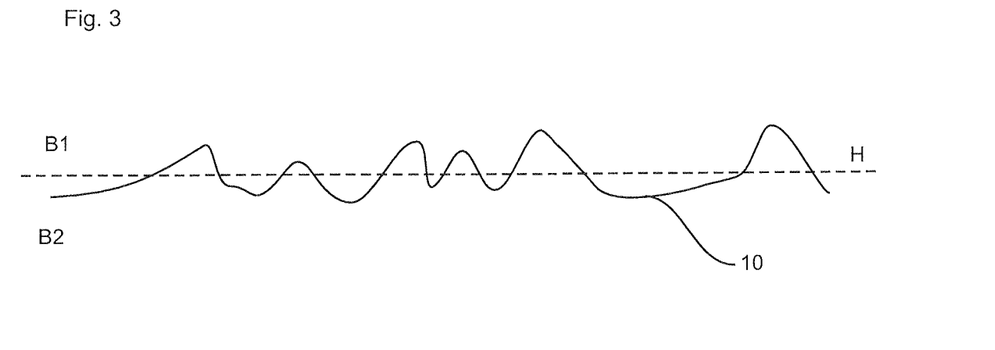
FIG. 3 is a diagrammatic illustration to explain the image evaluation.

FIG. 3 shows an example of a possible image evaluation. In this case the continuous line 10 refers to a surface which has a specific degree of roughness or surface texture, i.e. deviations in the direction Z. The broken horizontal line H can indicate a threshold value which serves to differentiate the values into a region B1 and a region B2. In one arrangement of the invention it would be possible for those component parts of the surface which are present in the region B1 to be additionally investigated and also for those surface regions which are present in the region B2 to be additionally investigated. In this way, influences which arise only as a result of these surface irregularities can be taken into consideration.

It is preferable in the case of the process described here for both the first method step, by which the topography of the surface is determined, and the method step, by which the optical evaluation is carried out for example with reference to the gloss, to be carried out on the same surface portion. In particular, however, the same surface segments which were recorded by the image-recording device, are compared with one another.

Figure 4:
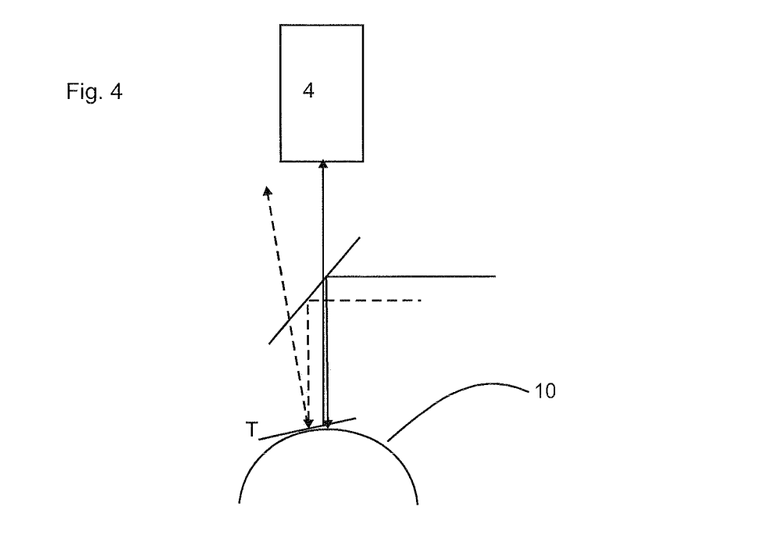
FIG. 4 is a further diagrammatic illustration for evaluation in the case of curved surfaces.

FIG. 4 shows a further example of the determination of properties of a surface which in this case is curved. If the radiation detector device is also arranged vertically above the surface to be investigated in this case, light would be reflected directly to the radiation detector unit only from such regions as extend horizontally. Light from differently curved regions (cf. broken lines), on the other hand, would also be deflected in other directions. The reference letter T designates a tangent in the region in which the radiation strikes. This deflection would also result from a lesser intensity in the image recording. For curves of this type the invention proposes that they should likewise be taken into consideration in the evaluation of an image or in the evaluation of measurement values respectively. In this case for example, a measured intensity value could be corrected by a factor which takes into consideration the curvature of the surface. In addition, the measurement of the brightness intensity over the angular range of from 0° to 90° with respect to the surface perpendicular is possible.

The Applicants reserve the right to claim all the features disclosed in the application documents as being essential to the invention, insofar as they are novel either individually or in combination as compared with the prior art.

LIST OF REFERENCES 1 apparatus
2 radiation device/first measuring instrument
4 radiation detector device/first measuring instrument
6 radiation device
10 surface
12 control device
14 image display device
16 memory device
18 deflecting mirror
22 processor device
24 evaluation device
B1, B2 regions of the surface
P1, P2 direction of radiation
T tangent

The invention claimed is:

1. A multiple-stage method of determining surface properties, with the steps:
providing at least one material having a surface;
in a first method step determining at least one topographical property including a height property of a plurality of different regions of the surface to be investigated, wherein for the determination of the topographical properties including the height properties of the plurality of different regions of the surface, the different regions of the surface are illuminated by a first illumination device from at least two different directions, and an incident beam from the first illumination device and an axis perpendicular to the different regions of the surface form an angle between 45° and 75°;
in a second method step determining an optical property of at least the different regions of the surface to be investigated and emitting values which are characteristic of the optical properties, wherein, in order to determine the optical properties, light radiation is directed onto the surface by a second illumination device and light radiation reflected and/or scattered by the surface is detected by a light radiation detector, wherein for the determination of the optical property radiation issuing from the second lamination device is coupled by way of a partially transparent mirror in a vertical direction by way of which the radiation reaches from the surface to the light radiation detector, and wherein the first illumination device directs light onto the plurality of the different regions of the surface at an angle different from the second illumination device, wherein,
when the values which are characteristic of the optical properties are determined, the topographical properties of the different regions of the surface are taken into consideration, wherein at least two regions of the regions of the surface, which differ in their height, are defined by at least one threshold height value differentiating the pluralities of different regions of the surface, wherein component parts of the surface are characterized as belonging to one of the pluralities of different regions of the surface based on their determined topographical properties including height properties relative to the at least one threshold height value, wherein the at least one topographical property including height properties of the component parts of the surface in at least one of the plurality of different regions of the surface is further investigated, wherein the optical properties of the plurality of different regions of the surface are compared mathematically, and wherein the light radiation detector records a spatially resolved image of the surface,
wherein all those and only those image portions, which have resulted in specified topography values in the scope of the first method step, are taken into consideration in determining the optical property,
wherein the first illumination device is a continuous illumination device with a plurality of light sources, which illuminate the surface form a plurality of sides, and wherein the first illumination device is switched on sequentially, wherein a plurality of images are recorded in succession, in which case the observation direction is altered.

2. The method according to claim 1, wherein, in order to determine the topographical property including the height property, light radiation is directed onto the different regions of the surface by the illumination device and light radiation reflected and/or scattered by the different regions of the surface is detected by the light radiation detector.

3. The method according to claim 1, wherein the light radiation detector is used to determine the optical property and to determine the topographical property including the height property.

4. The method according to claim 1, wherein the same image of the surface is evaluated in order to determine the optical property and to determine the topographical property including the height property.

5. The method according to claim 1, wherein a spatial allocation of the image of the topography measurement including the height property and of the image of the optical property measurement is carried out.

6. The method according to claim 1, wherein the spatially resolved image is divided into a plurality of image segments and at least one portion of the image segments is allocated to the first region and at least one portion of the image segments is allocated to the second region.

7. The method according to claim 1, wherein, in order to determine a texture property, radiation is directed onto the different regions of the surface at an angle which is formed with respect to a direction at a right angle to the surface and which is less than 10°.

8. The method according to claim 1, wherein three different regions of the surface are defined, wherein a first region is defined with heights of the surface portions in the region of from 0 to 5 µm, a second region with heights of between 5 and 10 µm, and a third region with heights of between 10 and 20 µm.

9. The method according to claim 1, wherein image portions of specified topographical properties including the height property are taken into consideration in determining the optical properties.

10. The method according to claim 1, wherein the different regions of the surface are illuminated peripherally with respect to a direction at a right angle to the surface.

11. The method according to claim 1, wherein the first illumination device directs light onto the different regions of the surface at slant angles different from the second illumination device.

12. The method according to claim 1, wherein in order to determine the optical property, the second illumination device radiates the light at an angle onto the surface, which forms an angle of less than 30° with respect to a perpendicular or a direction at a right angle to the surface respectively.

13. The method according to claim 1, wherein in order to determine the optical property, the second illumination device radiates the light at an angle onto the surface, which forms an angle of less than 10° with respect to a perpendicular or a direction at a right angle to the surface respectively.

14. The method according to claim 1, wherein the first illumination device which is used for the evaluation of the surface for the topographical properties including the height properties irradiates the light onto the surface at a different angle from the second illumination device which is used for the evaluation of the optical properties.

15. The method according to claim 1, wherein a quality control, a defect detection and/or characterization of a surface to be investigated is performed, wherein the surface to be investigated is a plastics material surface, a lacquered surface, a natural surface and/or leather.

16. A multiple-stage method of determining surface properties, with the steps:

providing at least one material having a surface;

in a first method step determining at least one topographical property including a curvature property of a plurality of different regions of the surface to be investigated, wherein for the determination of the topographical properties including the curvature properties of the plurality of different regions of the surface, the different regions of the surface are illuminated by a first light radiation device from at least two different directions, and an incident beam from the first radiation device and an axis perpendicular to the different regions of the surface form an angle between 45° and 75°;

in a second method step determining an optical property of at least the different regions of the surface to be investigated and emitting values which are characteristic of the optical properties, wherein, in order to determine the optical properties, light radiation is directed onto the surface by a second light radiation device and light radiation reflected and/or scattered by the surface is detected by a light radiation detector device, wherein the first light radiation device directs light onto the plurality of the different regions of the surface at an angle different from the second light radiation device, wherein, when the values which are characteristic of the optical properties are determined, the topographical properties of the different regions of the surface are taken into consideration, wherein at least two regions of the regions of the surface, which differ in their curvature, are defined by at least one threshold curvature value differentiating the pluralities of different regions of the surface, wherein component parts of the surface are characterized as belonging to one of the pluralities of different regions of the surface based on their determined topographical properties including curvature properties relative to the at least one threshold curvature value, wherein the at least one topographical property including curvature properties of the component parts of the surface in at least one of the plurality of different regions of the surface is further investigated, wherein the optical properties of the plurality of different regions of the surface are compared mathematically, and wherein the light radiation detector device records a spatially resolved image of the surface, wherein all those and only those image portions, which have resulted in specified topography values in the scope of the first measurement, are taken into consideration in determining the optical property, wherein the first illumination device is a continuous illumination device with a plurality of light sources, which illuminate the surface form a plurality of sides, and wherein the first illumination device is switched on sequentially, wherein a plurality of images are recorded in succession, in which case the observation direction is altered.

* * * * *